(12) United States Patent
Spincich et al.

(10) Patent No.: US 11,858,409 B2
(45) Date of Patent: Jan. 2, 2024

(54) SPOTLIGHT MODULAR ASSEMBLY FOR CHARGING INLETS

(71) Applicant: TE Connectivity Italia Distribution S.r.l., Turin (IT)

(72) Inventors: Demis Spincich, Turin (IT); Arianna Spolverato, Turin (IT)

(73) Assignee: TE Connectivity Italia Distribution S.r.l., Turin (IT)

( * ) Notice: Subject to any disclaimer, the term of this patent is extended or adjusted under 35 U.S.C. 154(b) by 0 days.

(21) Appl. No.: 17/667,085

(22) Filed: Feb. 8, 2022

(65) Prior Publication Data

US 2022/0250534 A1 Aug. 11, 2022

(30) Foreign Application Priority Data

Feb. 8, 2021 (IT) .......................... 102021000002699

(51) Int. Cl.
  *B60Q 1/00* (2006.01)
  *B60L 53/16* (2019.01)
  *B60L 53/30* (2019.01)
  *B60Q 1/26* (2006.01)

(52) U.S. Cl.
  CPC ............ *B60Q 1/0017* (2013.01); *B60L 53/16* (2019.02); *B60L 53/30* (2019.02); *B60Q 1/0088* (2013.01); *B60Q 1/2696* (2013.01)

(58) Field of Classification Search
  CPC ..................... B60L 53/16; B60L 53/30; B60Q 1/0017–0088; B60Q 1/2661–2696; H05B 47/105; H01R 13/7175; H01R 2201/26
  See application file for complete search history.

(56) References Cited

U.S. PATENT DOCUMENTS

| | | | |
|---|---|---|---|
| 5,751,135 A | 5/1998 | Fukushima et al. | |
| 7,128,450 B2 | 10/2006 | Tiesler et al. | |
| 7,999,665 B2* | 8/2011 | Chander | B60L 58/12 340/455 |
| 10,381,768 B2* | 8/2019 | Kosmalski | H01R 13/436 |

(Continued)

FOREIGN PATENT DOCUMENTS

| | | |
|---|---|---|
| DE | 102017111813 A1 | 12/2018 |
| DE | 102018109543 A1 | 10/2019 |

(Continued)

OTHER PUBLICATIONS

Italian Search Report, App No. 202100002699, dated Oct. 19, 2021, 11 pages.

(Continued)

*Primary Examiner* — Jason M Han
(74) *Attorney, Agent, or Firm* — Barley Snyder

(57) ABSTRACT

A spotlight modular assembly for providing external illumination to a charging inlet includes a first frame having a plurality of locking devices securing the spotlight modular assembly to the charging inlet, a second frame, and a circuit carrier and an illumination source electrically connected to the circuit carrier. The circuit carrier and the illumination source are encapsulated within the first frame and the second frame. A light of the illumination source comes out through the second frame. The spotlight modular assembly is removably attached to the charging inlet with the light of the illumination source directed toward the charging inlet.

20 Claims, 3 Drawing Sheets

(56) References Cited

U.S. PATENT DOCUMENTS

| | | |
|---|---|---|
| 2002/0081486 A1 | 6/2002 | Williams |
| 2006/0181049 A1 | 8/2006 | Kobayashi |
| 2010/0026238 A1 | 2/2010 | Suzuki |
| 2012/0212967 A1 | 8/2012 | Sawayanagi |
| 2013/0134937 A1 | 5/2013 | Umeda |
| 2013/0134947 A1 | 5/2013 | Wang |
| 2014/0042966 A1 | 2/2014 | Masuda et al. |
| 2017/0149176 A1 | 5/2017 | Kamamura |
| 2018/0351280 A1 | 12/2018 | Kosmalski et al. |
| 2019/0381905 A1 | 12/2019 | Winkler et al. |

FOREIGN PATENT DOCUMENTS

| | | |
|---|---|---|
| DE | 102018209848 A1 | 2/2020 |
| JP | H06325834 A | 11/1994 |
| JP | 2006205853 A | 8/2006 |
| JP | 2012064505 A | 3/2012 |
| JP | 2012181984 B2 | 9/2012 |
| JP | 2018133148 A | 8/2018 |
| JP | 2018206766 A | 12/2018 |
| JP | 2019218047 A | 12/2019 |
| JP | 2020013674 A | 1/2020 |
| KR | 20120064450 B1 | 6/2012 |

OTHER PUBLICATIONS

Extended European Search Report, Application No. 22155306.8-1012, dated Jun. 7, 2022, 8 pages.
Office Action from the Japanese Patent Office dated Mar. 22, 2023, corresponding to Application No. 2022-016158 with English translation, 14 pages.

\* cited by examiner

SPOTLIGHT MODULAR ASSEMBLY FOR CHARGING INLETS

CROSS-REFERENCE TO RELATED APPLICATIONS

This application claims the benefit of the filing date under 35 U.S.C. § 119(a)-(d) of Italian Patent Application No. 102021000002699, filed on Feb. 8, 2021.

FIELD OF THE INVENTION

The present invention relates to a charging inlet and, more particularly, to an illumination system of a charging inlet.

BACKGROUND

It is known in the art to provide a charging inlet of an electric vehicle-charging unit with an illumination system for illuminating the outside of the charging inlet. The illumination system may be used to facilitate the insertion of the charging plug and/or to indicate the charging status of the charging inlet.

It is also known at the state of the art to produce illumination systems comprising an LED connected to a printed circuit board (PCB) and to place them on the rear part of the charging inlet. For instance, document KR 2012 0 064 450 A discloses an illumination system comprising a LED unit and a series of optical lenses which is integrally formed with the charging inlet. On the other hand, U.S. Patent Application Publication No. 2017/0149176 A1 describes an LED unit which is fixed to the back of the charging inlet by screws.

The main drawback of these configurations lies in the need to provide the illumination system with a light guide material for directing the light emitted by the rear LED towards the front charging inlet, which increases the production costs. Moreover, since the illumination system is placed on the back part of the charging inlet, it cannot be reached from the outside once the charging inlet is inserted into the charging unit, hence the handling and the substitution of the illumination components in case of failure is difficult in this configuration. Finally, the illumination system according to this arrangement cannot be adapted to existing housings, but, on the contrary, it is required that the charging inlet is specifically designed so as to accommodate an LED connected to a PCB.

Other known configurations comprise a light emitting source directly built on the outside of a charging inlet of an electric vehicle. For instance, U.S. Patent Application Publication No. 2013/0134937 A1 discloses an illumination light source, for example an LED lamp, which is embedded in an upper peripheral wall of the housing recess of the charging device and which emits white light downward towards the charging inlet. Also in these cases, the illumination system has to be integrally formed with the charging inlet of the electric vehicle; in particular, it must be integrated in the housing recess of the charging unit. Therefore, if a single part of the illumination system needs to be replaced or adjusted, the whole illumination system needs to be removed and replaced.

SUMMARY

A spotlight modular assembly for providing external illumination to a charging inlet includes a first frame having a plurality of locking devices securing the spotlight modular assembly to the charging inlet, a second frame, and a circuit carrier and an illumination source electrically connected to the circuit carrier. The circuit carrier and the illumination source are encapsulated within the first frame and the second frame. A light of the illumination source comes out through the second frame. The spotlight modular assembly is removably attached to the charging inlet with the light of the illumination source directed toward the charging inlet.

BRIEF DESCRIPTION OF THE DRAWINGS

The invention will now be described by way of example with reference to the accompanying Figures, of which.

DETAILED DESCRIPTION OF THE EMBODIMENTS

In the following, the present invention is described with reference to particular embodiments as shown in the enclosed drawings. The present invention is not limited to the particular embodiments described in the following detailed description and shown in the figures, but, instead, the embodiments described simply exemplify several aspects of the present invention, the scope of which is defined by the appended claims. Further modifications and variations of the present invention will be clear for the person skilled in the art. Therefore, the present description must be considered as including all the modifications and/or variations of the present invention, the scope of which is defined by the appended claims. For simplicity, identical or corresponding components are indicated in the figures with the same reference numbers.

Figure 1:
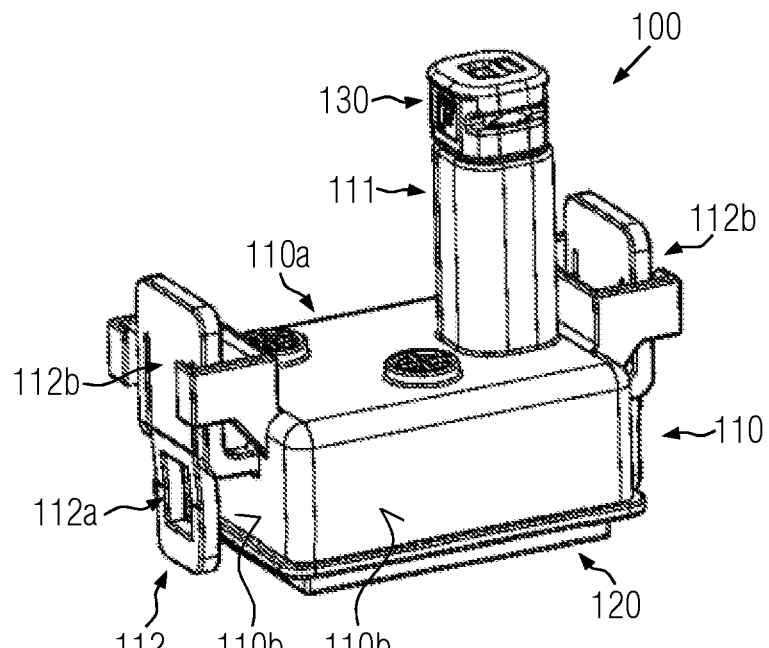
FIG. 1 is a perspective view of a modular assembly for providing external illumination to a charging inlet according to an embodiment.

FIG. 1 schematically illustrates a spotlight modular assembly 100 for providing external illumination to a charging inlet of a power-receiving unit or of a power-providing unit for an electric vehicle, according to an embodiment of the present invention. The spotlight modular assembly 100 comprises a first frame 110, provided with a vertical insertion pipe 111, and a second frame 120. The first frame 110 illustrated in FIG. 1 has the shape of an open parallelepiped, comprising a first surface 110a and four lateral surfaces 110b.

As shown in FIG. 1, two opposite lateral surfaces 110b of the first frame 110 are provided with two locking devices 112, one for each of the two opposite lateral surfaces 110b. Each locking device 112 has a flat portion 112b connected to the corresponding lateral surface 110b of the first frame 110 and a hook portion 112a configured to engage a mating component of the charging inlet. The vertical insertion pipe 111 for inserting an electric connector 130 is further formed on the first surface 110a.

The second frame 120, shown in FIG. 1, represents a "lid" for closing the first frame 110, thus forming a closed space in the spotlight modular assembly 100 for containing an illumination system. The second frame 120 is laser welded to the first frame 110.

The first frame 110 and the second frame 120 form a case for the illumination system. In an embodiment, the first frame 110 and the second frame 120 form a case having a first surface and a second surface. In the present application, the expression "first frame" and "first surface of the first frame" are used to indicate those elements placed further away from the external frame of a charging inlet 200, while the expressions "second frame" and "second surface of the second frame" are used to indicate those elements in contact with the external frame 200 of the charging inlet. In an embodiment, the case has the shape of a parallelepiped and comprises four lateral surfaces, a top surface and a bottom surface.

Figure 2:
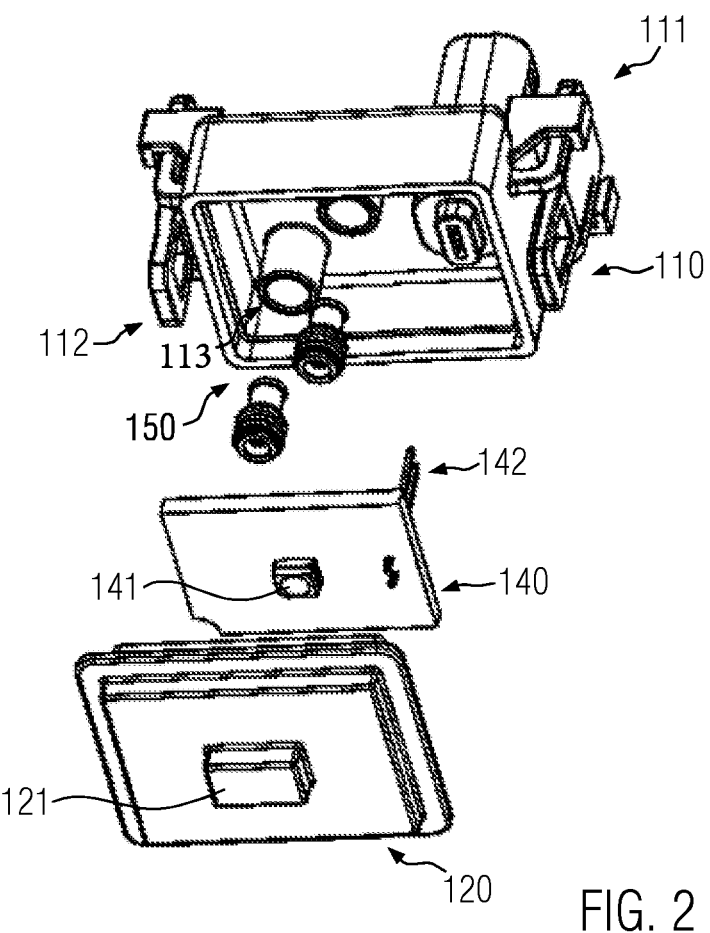
FIG. 2 is an exploded perspective view of the modular assembly.

The illumination system comprises a circuit carrier 140, for instance a printed circuit board (PCB), and a light source 141, for instance an LED, connected to the circuit carrier, as shown in FIG. 2. In this embodiment, the LED 141 is charged by the PCB 140 and the LED 141 emission can be controlled via the electronics of the PCB 140 and it can be used to illuminate the charging inlet for facilitating the insertion of the charging plug when the surrounding environment is dark, as described below. The spotlight modular assembly 100 is configured so that the light emitted from the light source 141 is directed towards the outside of the spotlight modular assembly 100, in particular, towards the charging inlet. The vertical insertion pipe 111 of the first frame 110 is designed to house an electrical connector 130 for supplying power to the illumination system of the spotlight modular assembly 100.

The first frame 110 and the second frame 120, in an embodiment, are made of a flexible material, for instance, a plastic material. The second frame 120 is completely made of a transparent material in an embodiment so that the light emitted from the light source 141 can come out from the spotlight modular assembly 100 and can reach the charging inlet. In an embodiment, the second frame 120 may be made of transparent plastic, for example polycarbonate. In an alternative embodiment, the second frame 120 may comprise at least a window made of transparent material for providing illumination to the charging inlet.

It is clear that, even if the first frame 110 represented in FIG. 1 has the shape of an open parallelepiped and the corresponding second frame 120 has a rectangular section, the first frame 110 and the second frame 120 of the spotlight modular assembly 100 may have any geometry, as long as they are configured to form a closed space for encapsulating the PCB 140 and the LED 141. For example, the first frame 110 and the second frame 120 may have a circular section and they may be designed so as to be wedged the one into the other to form a closed space in which the PCB 140 may be inserted.

The internal structure of the spotlight modular assembly 100 can be clearly seen in the exploded view of the spotlight modular assembly 100 in FIG. 2. The first frame 110 comprises internal features apt at wedging it into the second frame 120 and it is additionally provided with two locking devices 112 that allow removably fixing it to the external part of the charging inlet, as will be described in more detail below. The second frame 120 is provided with a protruding element 121 for fixing to a complementary part of the charging inlet.

The first frame 110 and the second frame 120 are hence wedged one into the other, to form a closed space for containing the PCB 140, which is connected to the LED 141 and to at least two electric pins 142 for providing electrical connection. In the configuration of FIG. 2, two dampers 150 are provided between the PCB 140 and the first frame 110, in order to reduce the mechanical stress to which the PCB 140 is subjected to, during operation. In fact, the dampers 150 prevent a direct contact between the PCB 140 and the first frame 110 made of a rigid material. The dampers 150 are inserted in corresponding receptacles 113 formed in the inner surface of the first frame 110. Even if FIG. 2 shows that two dampers 150 are placed between the PCB 140 and the first frame 110 and prevent direct contact of the PCB 140 with the first frame 110, it is clear that any other damping locking devices may be used in the spotlight modular assembly to reduce the mechanical stress of the PCB 140 and prevent damage of structural failures in the PCB 140 due to external vibrations. Moreover, any number of dampers 150 may be employed, for instance one, three, four or more. The dampers 150 further allow precise positioning of the PCB 140.

The external connector 130, shown in FIG. 1, may be used for supplying power to the electric pins 142 and hence to the PCB 140 and to the LED 141 connected to the PCB 140. The external connector 130 may have a receptacle having width dimensions comprised between 0.5 mm and 1 mm and depth dimensions comprised between 0.4 mm and 1 mm. For example, a NanoMQS connector with a two positioning terminal may be employed. The advantage of using small connectors, for instance NanoMQS connectors, to supply power to the circuit carrier 140 and the illumination source is that they can be adapted to supply power to an electric system having small dimensions.

Figure 3:
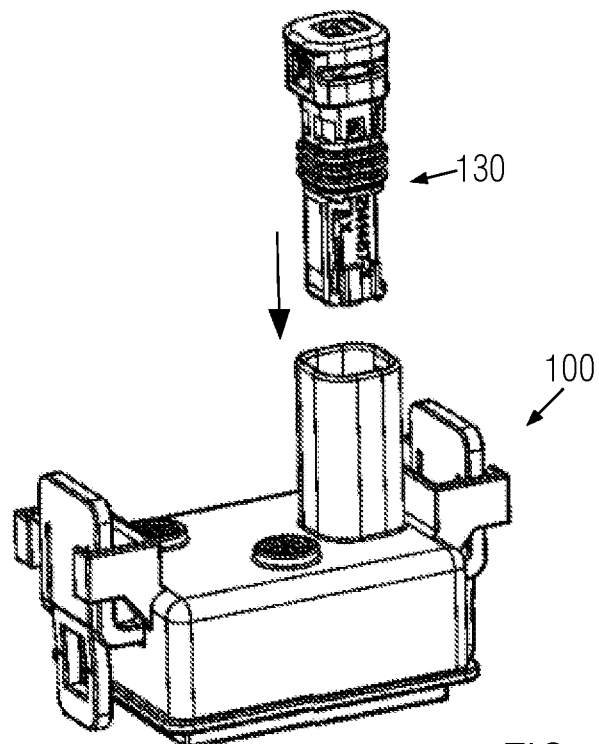
FIG. 3 is a perspective view of the insertion of a power supply connector into the modular assembly.

The insertion of the power supply connector 130 into the vertical insertion pipe 111 of the spotlight modular assembly 100 is schematically represented in FIG. 3. In an embodiment, a first end of the power supply connector 130 may be connected to the electric pins 142 of the PCB 140 and a second end of the power supply connector 130 may be connected to a cable, which, in turn, is connected to a control system for charging and operating the spotlight modular assembly 100. For example, the control system may be the control unit of an electric vehicle or a smart unit. The advantage of this configuration is that a smart electronic unit connected to the electric vehicle can be used to control the spotlight modular assembly 100 and to regulate the illumination of the charging inlet 200, while also regulating the charging status and the charging type of the charging inlet 200. The user can operate the smart electronic unit for example by locking devices of push buttons. In an embodiment, power is supplied to the smart electronic unit by the electric vehicle to which the smart electronic unit is connected.

Figure 4:
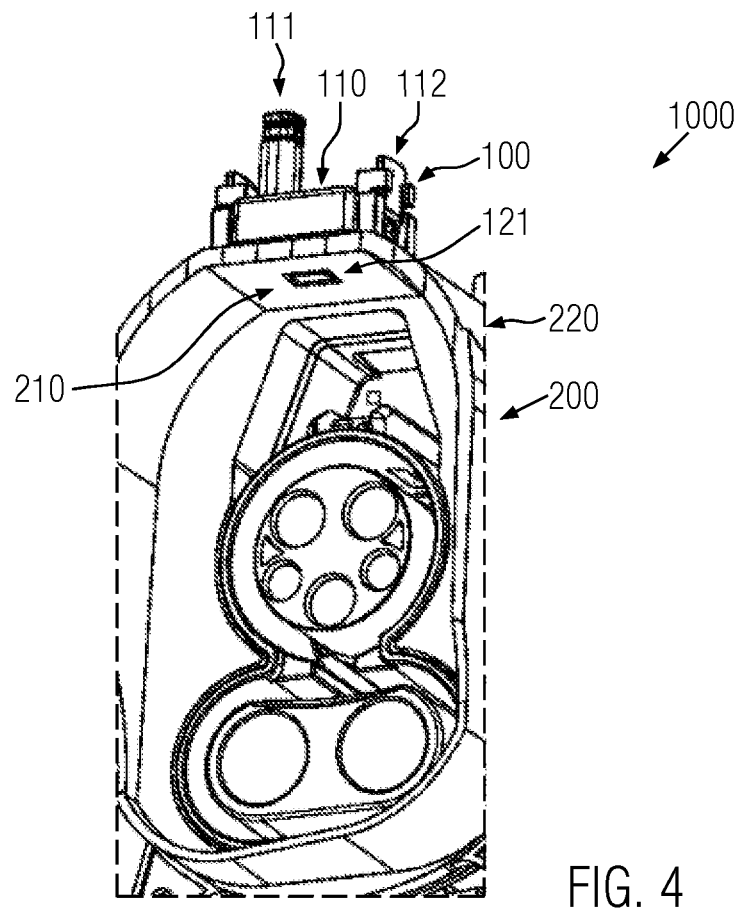
FIG. 4 is a detail perspective view of a charging system according to an embodiment comprising the modular assembly attached to a charging inlet.
Figure 5:
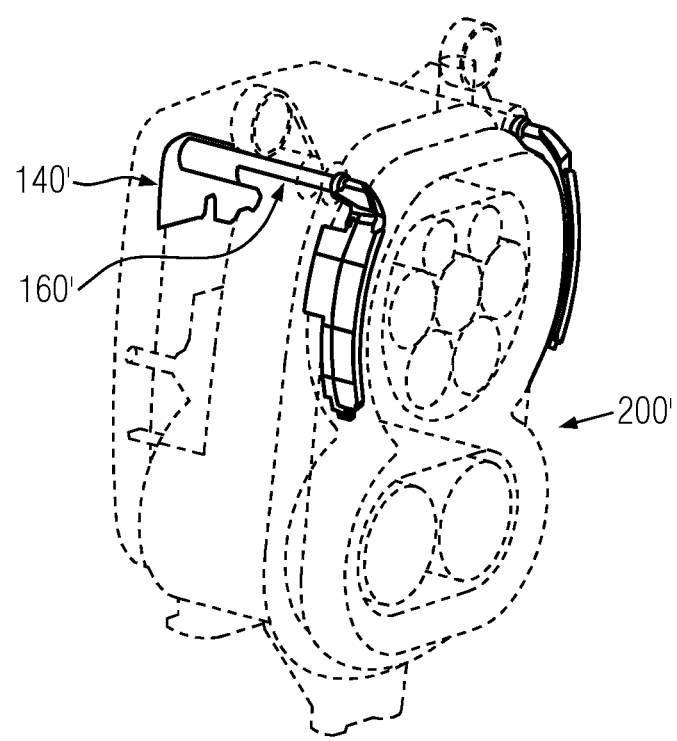
FIG. 5 is a perspective view of a charging system comprising an illumination system without any modular lighting assembly, according to prior art.

FIG. 4 shows a charging system 1000 for an electric vehicle comprising a spotlight modular assembly 100 and a charging inlet 200 of the power-receiving unit of an electric vehicle, according to an embodiment. According to a further embodiment of the present invention, an electric vehicle comprising a system 1000 as the one described herein is provided. This configuration may be compared with a typical charging system employed in an electric vehicle according to prior art, which is represented in FIG. 5.

As shown in FIG. 4, an external frame 220 of the charging inlet 200 of the electric vehicle is provided with an illumination slit 210. The illumination slit 210 allows the light coming from the spotlight modular assembly 100 to reach the charging inlet 200. In this way, the insertion of the charging plug into the charging inlet 200 in conditions in which the external environment is dark is facilitated. For example, the charging inlet 200 may be placed on a power-supplying connector or on a power-receiving connector of an electric vehicle and the spotlight modular assembly 100 may be used to provide illumination during the nighttime.

The size and the shape of the illumination slit 210 may be adjusted according to the size and the shape of the second frame 120 of the spotlight modular assembly 100, in order to maximize the amount of light emitted by the LED illumination source and coming out from the spotlight modular assembly 100 that can be directed towards the charging inlet 200. In an embodiment, the illumination slit 210 is placed on the upper part of the external frame 220 and the spotlight modular assembly 100 is mounted on the upper part of the external frame 220, so that its weight is supported by the external frame 220. Moreover, the protruding element 121 of the second frame 120 may be used for wedging the second frame 120 into the illumination slit 210 of the charging inlet 200 and to prevent reciprocal movements of the two elements during operation. For example, the protruding element 121 and the second frame 120 may have a rectangular section to facilitate insertion of the components; the protruding element 121 has the same shape as the illumination slit 210.

In an embodiment in which the second frame 120 has a transparent window, the one or more transparent windows are put in contact with one or more corresponding slits 210 formed on the external frame 220 of the charging inlet 200, so that the light emitted by the illumination source can shine through the spotlight modular assembly 100 and can illuminate the charging inlet 200. The window of transparent material of the second frame 120 and the illumination slit 210 are aligned so that each ray of light passing through the window of the second frame 120 also passes through the illumination slit 210 of the charging inlet 200, in order to assure better illumination. For example, the protruding element 121 can be made of the transparent material.

To the contrary, in standard configurations according to prior art, the PCB comprising the LED is placed on the rear part of the charging inlet 200'. For instance, in the configuration of FIG. 5, the PCB 140' is placed on the top, back part of the charging inlet 200'. In this case, a light guide material 160' needs to be employed to direct the light emitted by the LED on the PCB 140' towards the front part of the charging inlet 200', in order to illuminate it. Therefore, production costs are increased due to the introduction of the light guide material 160'. Further, it is necessary that the illumination system comprising the PCB 140' and the light guide material 160' is integrally formed with the charging inlet 200' of the charging unit, thus making it difficult to remove and replace the components in case of failure or for normal maintenance. Moreover, the illumination systems known in the state of the art cannot be adapted to the customer's specific requests, because they are designed to be adapted to the existing configuration of the charging inlet.

The spotlight modular assembly 100 according to the present invention may be instead specifically designed for meeting the customer requests thanks to the ease of assembling and of handling the different components.

The spotlight modular assembly 100 is assembled by inserting the PCB 140 connected to the LED 141 into the second frame 120 and by inserting the dampers 150 into the corresponding receptacles 113 of the first frame 110. Once the first frame 110 is laser welded to the second frame 120, the spotlight modular assembly 100 is ready for being attached to the charging inlet 200 of the electric vehicle, as shown in FIG. 4.

As shown in FIG. 4, the second frame 120 is fixed to the charging inlet 200 by inserting the protruding element 121 into the corresponding slit 210 of the external frame 220 of the charging inlet 200. The first frame 110 is further removably fixed to the external frame 220 of the charging inlet 200 by locking devices of the locking devices 112: the user must press the flat portion 112b of each locking device 112 to allow the hooking portions 112a to be locked to the corresponding coupling locking devices of the charging inlet 200. In this way, also the second frame 120, which is placed between the first frame 110 and the external frame 220 and is in contact with the external frame 220, is advantageously stabilized by the locking devices 112 of the first frame 110. In fact, the second frame 120 is pressed by the first frame 110 onto the external frame 220. In this way, even a more secure holding is assured.

Although it is illustrated in the embodiment FIG. 4 that the spotlight modular assembly 100 is placed on the upper part of the charging inlet 200, it is clear that it can be placed in any part of the charging inlet 200, provided that a slit is formed on that part of the charging inlet 200, in order to allow the light coming from the spotlight modular assembly 100 to reach the charging inlet 200. For instance, the spotlight modular assembly 100 may be placed on any of the sides of the charging inlet 200 or even on the bottom of the charging inlet 200, according to specific customer requests. The directions recited here are defined by the gravity force and the "upper part" and the "lower part" of the frame 220 are defined according to the direction of the gravity force: an object subjected to the gravity force would naturally fall from the "upper part" of the frame towards the "lower part" of the frame 220. The "upper part of the external frame of the charging inlet" indicates the part of the charging inlet 200 directed toward the roof of the car and the "lower part of the external frame of the charging inlet" indicates the part of the charging inlet 200 directed towards the wheels of the car.

In the instance of failure of a component of the spotlight modular assembly 100, the entire system 100 can be easily removed and substituted. In this way, there is no need to remove and replace the whole charging inlet 200 because of a failure of a single component in the spotlight modular assembly 100, which occurs in illumination systems 200' according to prior art.

The spotlight modular assembly 100 can be easily assembled and built on a pre-existing charging inlet 200 without need to adapt it and whose components can be easily removed and replaced in case of failure. The spotlight modular assembly 100 according to the present invention can be controlled directly by the electric vehicle or it can be controlled by a smart unit provided in the electric vehicle. In this way, once the PCB receives the corresponding signal from the vehicle or from the smart unit, the LED is induced to emit light to illuminate the charging inlet 200. Light can be thus easily seen by the user from the outside. This configuration is advantageous because the spotlight modular assembly 100 can be automatically controlled by the body computer of the vehicle that gives the input when the external flap of the vehicle is opened by a user.

While the invention has been described with respect to physical embodiments constructed in accordance therewith, it will be apparent to those skilled in the art that various modifications, variations and improvements of the present invention may be made in the light of the above teachings and within the purpose of the appended claims without departing from the spirit and intended scope of the invention. For example, even if it is shown in FIG. 4 that the spotlight modular assembly 100 is placed on the charging inlet 200 of the power-receiving unit of an electric vehicle, it is clear that the spotlight modular assembly 100 may alternatively be placed on the charging inlet 200 of the power-supplying unit of a charging station. In addition, those areas in which it is believed that those of ordinary skill in the art are familiar have not been described herein in order not to unnecessarily obscure the invention described. Accordingly, it must be understood that the invention is not to be limited by the specific illustrative embodiments, but only by the scope of the appended claims.

According to a further embodiment of the present invention, a method for implementing a charging system 1000 as the ones described above in an electric vehicle is provided, wherein the method comprises the following steps: orienting the spotlight modular assembly 100 so that the second frame 120 is put in contact with the illumination slit 210; locking the spotlight modular assembly 100 to the external frame 220 of the charging inlet 200 with the locking devices 112; reversibly or removably connecting an electric connector 130 to the spotlight modular assembly 100 in order to supply power to the illumination source 141 electrically connected to the circuit carrier 140; and connecting said electric connector 130 also to a control unit.

What is claimed is:

1. A spotlight modular assembly for providing external illumination to a charging inlet, comprising:
   a first frame having:
      a plurality of locking devices securing the spotlight modular assembly to the charging inlet;
      a base wall; and
      a plurality of sidewalls defining an opening opposite the base wall;
   a second frame formed of a transparent material and arranged over and covering the opening of the first frame; and
   a circuit carrier and an illumination source electrically connected to the circuit carrier, the circuit carrier and the illumination source are arranged within the opening and encapsulated within the first frame and the second frame, a light of the illumination source comes out through the second frame, the spotlight modular assembly is removably attached to the charging inlet with the light of the illumination source directed toward the charging inlet.

2. The spotlight modular assembly of claim 1, wherein the second frame has a window formed of a transparent material.

3. The spotlight modular assembly of claim 1, wherein the circuit carrier is a printed circuit board oriented generally parallel to the base wall of the first frame.

4. The spotlight modular assembly of claim 3, wherein the illumination source is an LED connected to a first side of the printed circuit board, the LED positioned so as to transmit light in a direction of the opening of the first frame and toward the second frame.

5. The spotlight modular assembly of claim 4, further comprising a damping device arranged between a second side of the circuit board, opposite the first side, and an interior side of the base wall of the first frame.

6. The spotlight modular assembly of claim 5, further comprising a receptacle formed on the interior side of the base wall, wherein the damping device is received within the receptacle and reduces a mechanical stress on the circuit carrier.

7. The spotlight modular assembly of claim 5, wherein the damping device does not form an electrical connection with the illumination source.

8. The spotlight modular assembly of claim 1, wherein an insertion pipe is formed on and extends from an exterior side of the base wall of the first frame, the assembly further comprising an electrical connector removably connected to the insertion pipe for electrically connecting to the circuit carrier.

9. The spotlight modular assembly of claim 8, wherein the electrical connector supplies power to the illumination source via a plurality of conductive pins extending from the circuit carrier and into the insertion pipe.

10. The spotlight modular assembly of claim 9, wherein the electrical connector is a small connector having receptacles with a width dimension between 0.5 mm and 1 mm and a depth dimension between 0.4 mm and 1 mm.

11. The spotlight modular assembly of claim 10, wherein the electrical connector is a NanoMQS connector.

12. A method for implementing a charging system, comprising:
   providing the spotlight modular assembly of claim 1;
   orienting the second frame of the spotlight modular assembly in contact with an illumination slit of a charging inlet;
   locking the spotlight modular assembly to an external surface of an external frame of the charging inlet with the locking devices;
   connecting an electric connector to the spotlight modular assembly to supply power to the illumination source; and
   connecting the electric connector to a control unit.

13. An external frame of a charging inlet, comprising:
   an external frame wall having an interior side defining an inner cavity adapted to receive a charging plug, and an exterior side opposite the interior side and facing away from the inner cavity;
   an illumination slit allowing passage of a light from an illumination source of a spotlight modular assembly attached to the exterior side of the external frame of the charging inlet, a second frame of the spotlight modular assembly through which the light from the illumination source comes out is in contact with the illumination slit; and
   a plurality of coupling locking devices formed on the exterior side of the external frame and locked to a plurality of locking devices of the spotlight modular assembly to removably fix a position of the spotlight modular assembly on the exterior side of the external frame.

14. The external frame of claim 13, wherein the spotlight modular assembly comprises a first frame, including:
   a plurality of locking devices securing the spotlight modular assembly to the charging inlet;
   a base wall; and
   a plurality of sidewalls defining an opening opposite the base wall, the second frame formed if a transparent material and arranged over and covering the opening of the first frame; and
   a circuit carrier, the circuit carrier and the illumination source arranged within the opening and encapsulated within the first frame and the second frame.

15. A charging system, comprising:
   a charging inlet having an external frame with an illumination slit; and a spotlight modular assembly attached to an exterior side of the external frame, the spotlight modular assembly including:
  a first frame having a base wall, a plurality of sidewalls defining an opening opposite the base wall, and a plurality of locking devices securing the spotlight modular assembly to the charging inlet;
  a second frame arranged over and covering the opening of the first frame; and
  a circuit carrier and an illumination source electrically connected to the circuit carrier, the circuit carrier and the illumination source are encapsulated within the opening by the first frame and the second frame, a light of the illumination source comes out through the second frame, the spotlight modular assembly is removably attached to the exterior side of the external frame of the charging inlet with the light of the illumination source directed toward the charging inlet and passing through the illumination slit, with the spotlight modular assembly attached to the charging inlet, at least the first frame and the circuit carrier are arranged external to the external frame of the charging inlet.

16. The charging system of claim 15, wherein the second frame contacts the illumination slit and the illumination source is arranged external to illumination slit with the spotlight modular assembly attached to the external frame of the charging inlet.

17. The charging system of claim 15, wherein the second frame has a window formed of a transparent material that is aligned with the illumination slit.

18. The charging system of claim 15, wherein the spotlight modular assembly is controlled by an electric vehicle having the charging system.

19. The charging system of claim 15, further comprising a smart electronic unit controlling the spotlight modular assembly.

20. An electric vehicle comprising the charging system of claim 15.

* * * * *